F. E. ALLEN.
AUTOMOBILE DIRECTION INDICATOR.
APPLICATION FILED OCT. 6, 1917.
1,332,094. Patented Feb. 24, 1920.
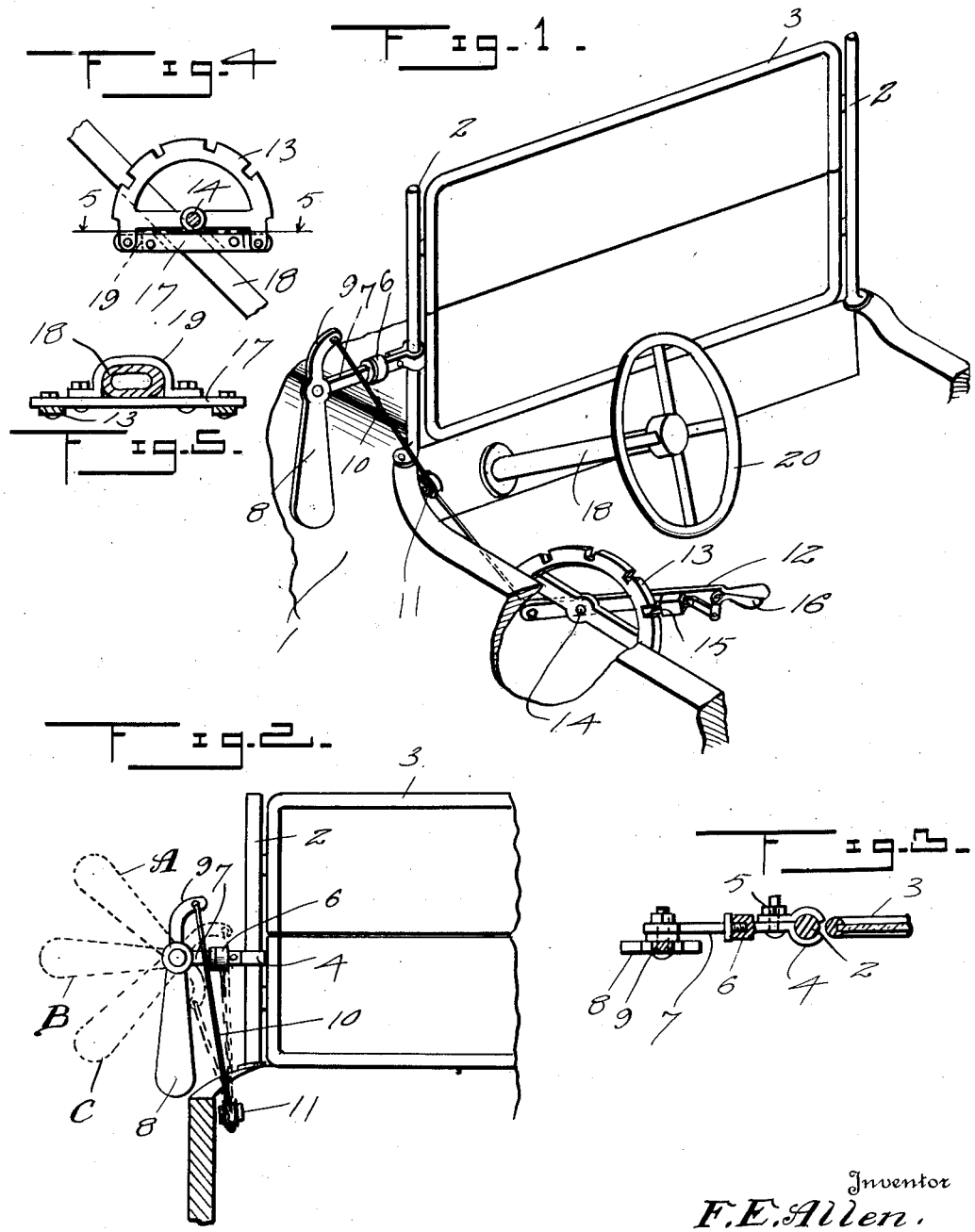

UNITED STATES PATENT OFFICE.

FRANK E. ALLEN, OF PENOKEE, KANSAS.

AUTOMOBILE DIRECTION-INDICATOR.

1,332,094.  Specification of Letters Patent.  Patented Feb. 24, 1920.

Application filed October 6, 1917. Serial No. 195,069.

*To all whom it may concern:*

Be it known that I, FRANK E. ALLEN, a citizen of the United States, residing at Penokee, in the county of Graham and State of Kansas, have invented certain new and useful Improvements in Automobile Direction-Indicators; and I do hereby declare the following to be a full, clear, and exact description of the invention, such as will enable others skilled in the art to which it appertains to make and use the same.

This invention relates to improvements in direction indicators and has for one of its objects the provision of a device of this character whereby the operator of the automobile may readily and conveniently indicate to the traffic in the front and rear thereof in which direction a turn is to be made or if a stop is contemplated, thus obviating numerous accidents caused by approaching traffic not being aware of the procedure of the respective automobile.

Another object of this invention is the provision of a signaling arm disposed laterally of an automobile and adapted to be swung into various positions to indicate in which direction a turn is to be made or if a stop is to be made.

A further object of this invention is the provision of novel means for actuating said signaling arm and which is so located that the same is in convenient reach of the operator whereby the operator may readily and conveniently actuate the signaling arm.

A still further object of this invention is the provision of an automobile direction indicator of the above stated character, which shall be simple, durable and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing in which:—

Figure 1 is a fragmentary perspective view of an automobile direction indicator constructed in accordance with my invention, Fig. 2 is a fragmentary rear elevation of the same, Fig. 3 is a detail sectional view illustrating the means of pivotally supporting the signaling arm to the automobile, Fig. 4 is a fragmentary elevational view illustrating the means of securing a quadrant either to the body of an automobile or to the steering post thereof, and Fig. 5 is a sectional view taken on the line 5—5 of Fig. 4.

Referring in detail to the drawing, the numeral 1 indicates an automobile having secured thereto vertical uprights 2 which support an ordinary wind shield 3. The vertical uprights 2 are adapted to have my invention secured or supported thereon. A clamp 4 is secured to one of the vertical uprights 2 by means of a bolt 5 and has an enlarged portion 6 that is internally screw threaded. An arm 7 is threaded into the enlarged portion 6 and has pivoted to its outer end a signaling arm 8. The signaling arm 8 may be of any desired formation and has formed upon its pivoted end a curved arm 9 to which is secured a cable 10. The cable 10 passes over a pulley 11 secured to the body of the automobile and connected to an actuating or operating lever 12. The operating lever 12 is pivoted to a quadrant 13 as illustrated at 14. The operating lever 12 has slidably mounted thereon a dog 15 controlled by a hand grip 16, whereby the dog may be disengaged from the various notches in the quadrant for the purpose of swinging the signaling arm 8 into various positions as illustrated in Fig. 2.

When the signaling arm 8 occupies a position as illustrated at A in Fig. 2, it indicates that the automobile is going to make a turn to the left. When the signaling arm is moved in to position as illustrated at B, it indicates that a stop is to be made. When the signaling arm occupies a position as illustrated at C it indicates that the automobile is going to make a turn to the right. The normal position of the signaling arm being disposed downwardly in a vertical plane as illustrated in full lines in Fig. 2 and which lies in close proximity to the body of the automobile but when moved into signaling position as illustrated at A, B, and C, it will be in clear view of the traffic in front and rear of the respective automobile. The signaling arm 8 may be painted or coated any desired color, but preferably white so that the same can be seen at night time.

The ends of the quadrant 13 are connected by a bar 17 which may be bolted or otherwise secured to the side of the automobile as illustrated in Fig. 1 in convenient reach of the operator. However, the quadrant 13 may be readily and conveniently secured to the steering post 18 of the automobile by means of a clamp or bracket 19 secured to the bar 17, whereby the operator of the automobile may reach around the steering wheel 20 and actuate the operating lever 12 to swing the signaling arm into various signaling positions.

While I have shown and described the preferred embodiment of my invention, it will be understood that minor changes in construction, combination, and arrangement of parts may be made without departing from the spirit and scope of the invention, as claimed.

What is claimed is:—

An automobile direction indicator comprising a clamp detachably secured to one of the vertical uprights of a wind-shield of an automobile and having an internally screw threaded socket, an arm having a screw threaded end threaded into said socket, a shoulder formed on said arm and adapted to abut one end of the clamp for limiting the movement of the screw threaded end of the arm within said socket, a signaling member pivoted to the free end of said arm at a point adjacent one end, and an operating means connected to the signaling member for swinging said signaling member into various signaling positions.

In testimony whereof I affix my signature in presence of two witnesses.

FRANK E. ALLEN.

Witnesses:
    R. A. COLLINS,
    C. L. KOBLER.